United States Patent
Egawa et al.

[15] 3,654,561
[45] Apr. 4, 1972

[54] APPARATUS FOR MEASURING A PEAK VALUE AND A PEAK-TO-PEAK VALUE OF AN ELECTRICAL SIGNAL

[72] Inventors: Mitsuru Egawa; Tomoteru Takano, both of Tokyo, Japan

[73] Assignee: Tokyo Seimitsu Co., Ltd., Tokyo, Japan

[22] Filed: Mar. 10, 1970

[21] Appl. No.: 18,037

[52] U.S. Cl................................328/151, 307/235, 307/238, 330/51, 330/84, 330/99, 330/110
[51] Int. Cl. ........................................................H03k 17/00
[58] Field of Search........................330/51, 84, 99, 110, 103; 307/235, 238, 246; 328/151, 127

[56] References Cited

UNITED STATES PATENTS

| | | | |
|---|---|---|---|
| 3,413,491 | 11/1968 | Reeves et al. | 307/304 X |
| 3,287,651 | 11/1966 | Ingle | 330/51 UX |
| 3,504,194 | 3/1970 | Eastman et al. | 307/238 |
| 3,287,570 | 11/1966 | Wilson | 328/151 X |

*Primary Examiner*—Roy Lake
*Assistant Examiner*—James B. Mullins
*Attorney*—Robert E. Burns and Emmanuel J. Lobato

[57] ABSTRACT

Apparatus for measuring a peak value and a peak-to-peak value of an electrical signal provides one or a plurality of high gain DC amplifier, diode, capacitor, high input impedance DC amplifier and feedback circuit, thereby carrying out a measurement extending over a wide amplitude range of an input measuring signal. By providing one or plural switching circuit, the operation of the measurement can be ceased and the measured peak value or peak-to-peak value can be stored in the capacitor to the next measuring period. Further, various modified apparatuses can measure a positive peak value, a negative peak value and a peak-to-peak value.

8 Claims, 12 Drawing Figures

PRIOR ART Fig. 1     Fig. 2
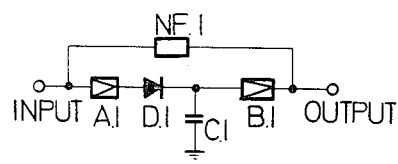
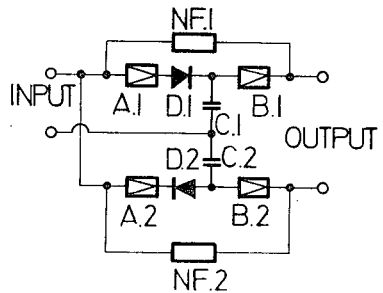
Fig. 3A    Fig. 3B    Fig. 3C
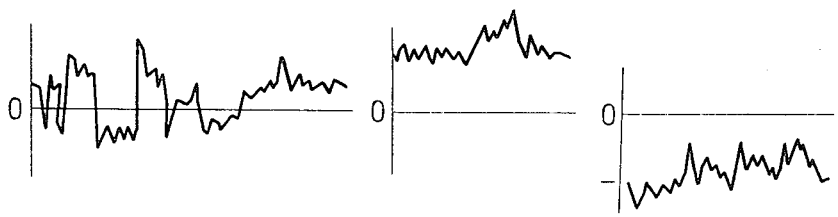
Fig. 4A     Fig. 4B
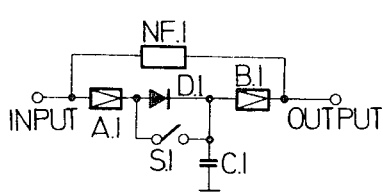
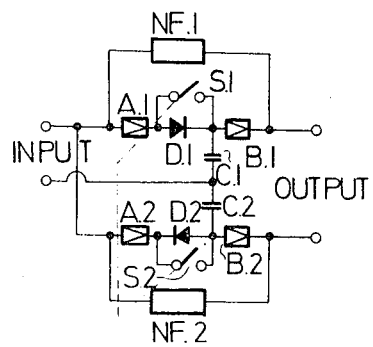

APPARATUS FOR MEASURING A PEAK VALUE AND A PEAK-TO-PEAK VALUE OF AN ELECTRICAL SIGNAL

This invention relates to a peak value measuring apparatus and further relates to a peak-to-peak value measuring apparatus for automatically storing a maximum value of an electrical signal or a difference between a maximum and a minimum value of an electrical signal and indicating its stored value in an indicating apparatus such as an indicating meter.

Two kinds of methods are utilized in a conventional peak value measuring apparatus. One is a method for measuring the effective value on the assumption that the measured signal is a sinusoidal wave and converts the effective value measured into a peak value of an electrical signal. However, in this method of converting the effective value into the peak value, it is a necessary condition that a waveform and amplitude of the measured signal is repeated continuously in the same state and further the measured signal has a known waveform. When the measured signal has a known waveform repeating the same waveform and the same amplitude, the measured effective value can correctly be converted to the peak value. However, this method concerns actually measuring the effective value and not the peak value. The other is a method for measuring the peak value as it stands. That is, it concerns connecting a diode $D_1$ and capacitance $C_1$ in a series connection and applying an electrical signal to this series circuit composed of a diode $D_1$ and a capacitor $C_1$ and picking up a signal between both terminals of a capacitor as an output signal. In the case of measuring, a charged voltage in the capacitor $C_1$ of the circuit is discharged and the measured signal is applied to the circuit. When a positive voltage is applied to the circuit in a state of a conductive direction of the diode $D_1$, the diode $D_1$ becomes a conductive condition and the capacitor $C_1$ is charged to the value of the applied signal. In this condition, the diode $D_1$ becomes a further conductive condition only in a state of applying an electrical signal having a larger value than that of the charged voltage stored in the capacitor $C_1$, that is, a positive maximum value of the applied signal is charged into the capacitor $C_1$. Namely, the positive peak value is stored to the capacitor $C_1$, thereby the positive peak value can be measured. In this case, using capacitor $C_2$ and diode $D_2$ reversing the direction of the diode $D_1$, the negative peak value can be stored in the capacitor $C_2$ in the same manner. With result of this, by using a parallel connection of the above-mentioned circuits, the positive signal is applied to the diode $D_1$ and the maximum voltage value of the positive signal is charged into the capacitor $C_1$, in the same manner, the maximum voltage value of the negative signal is charged into the capacitor $C_2$. Then, the peak-to-peak value can be measured by the difference between the positive peak value stored in the capacitor $C_1$ and the negative peak value stored in the capacitor $C_2$.

However, the above-mentioned method of measuring the peak value and the peak-to-peak value has a drawback as described below. That is, in carrying out the above-mentioned method, it is necessary that the diodes used are the ideal diodes, that is, a resistance of a conductive direction of the diode being zero, and a resistance of a reversing direction of the diode being infinity. However, in the actual condition, a characteristic of a conductive direction of a diode actually presents a large resistance in a low voltage region. In accordance with the increase of the applied voltage, the resistance of a conductive direction of the diode decreases and the characteristic of the diode becomes an ideal condition. With result of this, the measurement of the peak value cannot be carried out for the voltage region whereon the forward resistance of the diode presents infinity. Further, in this case, the above-mentioned method presents a limit of response time because of a time constant produced by the product of the resistance of the diode and a capacitance of the capacitor. In this case, when the capacitor is selected as a small value, the time constant in a charging period can be decreased, however, the time constant in a discharging period also decreases because of a value of a reverse resistance of the diode not being infinity.

Further, in the conventional method of measuring the peak value of the electrical signal, a switching circuit is connected between both terminals of the capacitor and is closed for discharging the stored voltage in the resetting operation. For this reason, the initial terminal voltage of the capacitor is zero and the measurement can be carried out only for the electrical signal having a zero value and cannot be carried out for the electrical signal having a unilateral polarity, that is, only positive polarity or negative polarity. Because, in the above-mentioned method, the measurement is carried out in accordance with the basis of zero point.

The object of the present invention is to overcome the above-mentioned drawback and to provide an apparatus for measuring and extending over the wide measuring range of a peak value or peak-to-peak value and indicating the measured value in the indicating apparatus precisely.

Another object of the present invention is to automatically store a maximum value or a difference in value between a maximum value and a minimum value and indicating the peak value or peak-to-peak value in the indicating apparatus.

A further object of the present invention is to provide an apparatus for measuring a peak value or a peak-to-peak value quickly and precisely with a simple operation.

A still further object of the present invention is to provide an apparatus for measuring a peak value or a peak-to-peak value of an electric signal having a unilateral polarity.

Further features and advantages of the present invention will be apparent from the ensuing description with reference being made to the accompanying drawings to which, however, the scope of the invention is no way limited.

FIG. 1 is a simplified block diagram illustrating a basic circuit of a peak value measuring apparatus of the present invention;

FIG. 2 is a simplified block diagram illustrating a basic circuit of a peak-to-peak value measuring apparatus of the present invention;

FIGS. 3A to 3C show waveforms of the input signal;

FIGS. 4A and 4B are a simplified block diagram in accordance with another embodiment of the present invention;

Figure 5A:
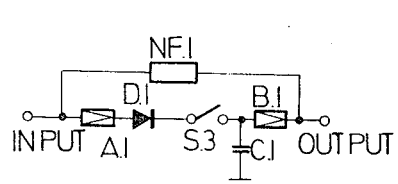
FIGS. 5A and 5B are a simplified block diagram in accordance with a further embodiment of the present invention.

Referring to FIG. 1, the apparatus for measuring a peak value comprises a high gain DC amplifier $A_1$, being connected to an input terminal of a series circuit of a diode $D_1$ and a capacitor $C_1$, a high impedance DC output amplifier $B_1$ being connected to a connection point of the diode $D_1$ and the capacitor $C_1$ and a negative feedback loop being connected from an output of the output amplifier $B_1$ to an input of the high gain DC amplifier $A_1$. In this case, a positive input signal $e_1$ applied to an input terminal being amplified by an amplification factor G of the DC amplifier $A_1$, and the amplified voltage $Ge_1$ is applied to an input of the diode $D_1$. That is, by utilizing the amplified voltage $Ge_1$, the diode $D_1$ can be operated in the ideal region of the diode characteristic. The capacitor $C_1$ is charged by the amplified voltage and a charged voltage being stored in the capacitor becomes a voltage $C_2$. The charged voltage $e_2$ in the capacitor $C_1$ is amplified by the amplifier $B_1$ being provided with a unity gain D-C amplifier $B_1$, and an output $e_2$ of the amplifier $B_1$ is fedback to the input terminal of the high gain D-C amplifier $A_1$. Consequently, a voltage applied to the input terminal of the D-C amplifier $A_1$ voltage $(e_1-e_2)$, and the voltage $(e_1-e_2)$ is amplified by the amplifier $A_1$. Then, the amplified voltage $G(e_1-e_2)$ is applied to the input terminal of the diode $D_1$. In this case, when the capacitor is charged to a voltage $e_2$, the voltage applied between both terminals of the diode $D_1$ is $\{G(e_1-e_2)-e_2\}$. When a value of the amplification factor G is selected in $G \gg 1$, the voltage, applied between both terminals of the diode becomes $G(e_1-e_2)$. In the conventional apparatus for measuring the peak value, the above-mentioned applied voltage is the difference between the input voltage and the charged voltage in the capacitor $C_1$, that is, ($e_1-e_2$). Consequently, an error is produced in the case where the diode $D_1$ is operated in the high resistance region, that is, in the weak current region. However, in the apparatus of the present invention, the above-mentioned drawback can be completely overcome.

Further, the apparatus of the present invention provides a negative feedback circuit, thereby enlarging a linear operating region in spite of the limit of the linear range of the high gain DC amplifier $A_1$.

The circuit shown in FIG. 2 is a parallel connection of the circuit shown in FIG. 1 wherein the directions of the diodes $D_1$ and $D_2$ are selected in opposite directions from each other. The circuit shown in FIG. 2 is purposed for measuring a difference in voltage between a positive peak value and a negative peak value, that is, a peak-to-peak value as shown in the waveform in FIG. 3A.

The circuit shown in FIG. 4A provides a switch $S_1$ between both terminals of the diode $D_1$ shown in FIG. 1 thereby measuring a peak value of a waveform shown in FIGS. 3B and 3C which is composed of only positive polarity or only negative polarity waveform. In this case, the switch $S_1$ is closed and next, opened when the measurement is carried out, a positive or a negative initial voltage appearing in the input terminal is stored in the capacitor $C_1$. The circuit shown in FIG. 4B provides two switches $S_1$ and $S_2$ between both terminals of the diodes $D_1$ and $D_2$ shown in FIG. 2 and the switch $S_1$ and $S_2$ are operated simultaneously by using, for example, a duplex switch. In the circuit shown in FIG. 4B, when the input voltage applied to the input terminal is larger than the voltage stored in the capacitor $C_1$ and $C_2$, the input voltage is stored in the capacitor $C_1$ and the input voltage applied to the input terminal, which is lower than the voltage stored in the capacitor $C_1$ and $C_2$, is stored in the capacitor $C_2$, thereby measured the peak-to-peak value of the output of the applied signal.

Figure 5B:
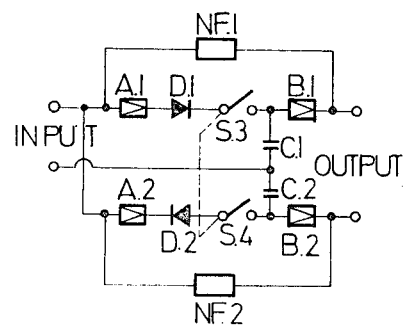

In the circuit shown in FIGS. 5A and 5B, one switch $S_3$ or two switches $S_3$ and $S_4$ are provided on the output side of the diode $D_1$ and diode $D_2$, and the measurement can be ceased by opening the switches $S_3$ and $S_4$. For example, in the measurement of the addendum circle of a toothed wheel, it is necessary that the measured value in one addendum is stored to the measurement of the next addendum whereon the measurement is repeated. By using the circuit shown in FIGS. 5A and 5B, the above-mentioned measurement can be carried out. That is, the capacitors $C_1$ and $C_2$ store the measured value when the measurement is ceased and the measurement can be continued by closing the switches $S_3$ and $S_4$. In the circuit shown in FIGS. 5A and 5B, the switches $S_3$ and $S_4$ are provided on the output sides of the diodes $D_1$ and $D_2$. However, the same effect can be obtained also by providing the switches on the input sides of the diodes $D_1$ and $D_2$.

Figure 6A:
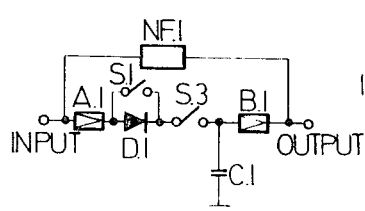
FIGS. 6A and 6B are a simplified block diagram in accordance with a still further embodiment of the present invention.
Figure 6B:
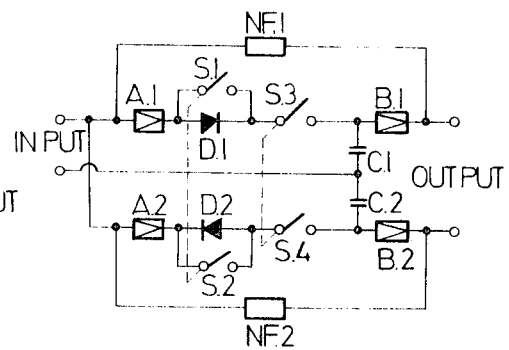

FIGS. 6A and 6B show respectively, the circuit combining the circuit shown in FIGS. 4A and 5A and FIGS. 4B and 5B. By using the circuit shown in FIGS. 6A and 6B, the measurement having the following advantage can be carried out, 1. improvement of the characteristics of the diode;
2. measurement of the peak value of the peak-to-peak value with reference to the initial value stored in the capacitor; and
3. the measured value can be stored to the following measuring period by opening the switch.

Figure 7:
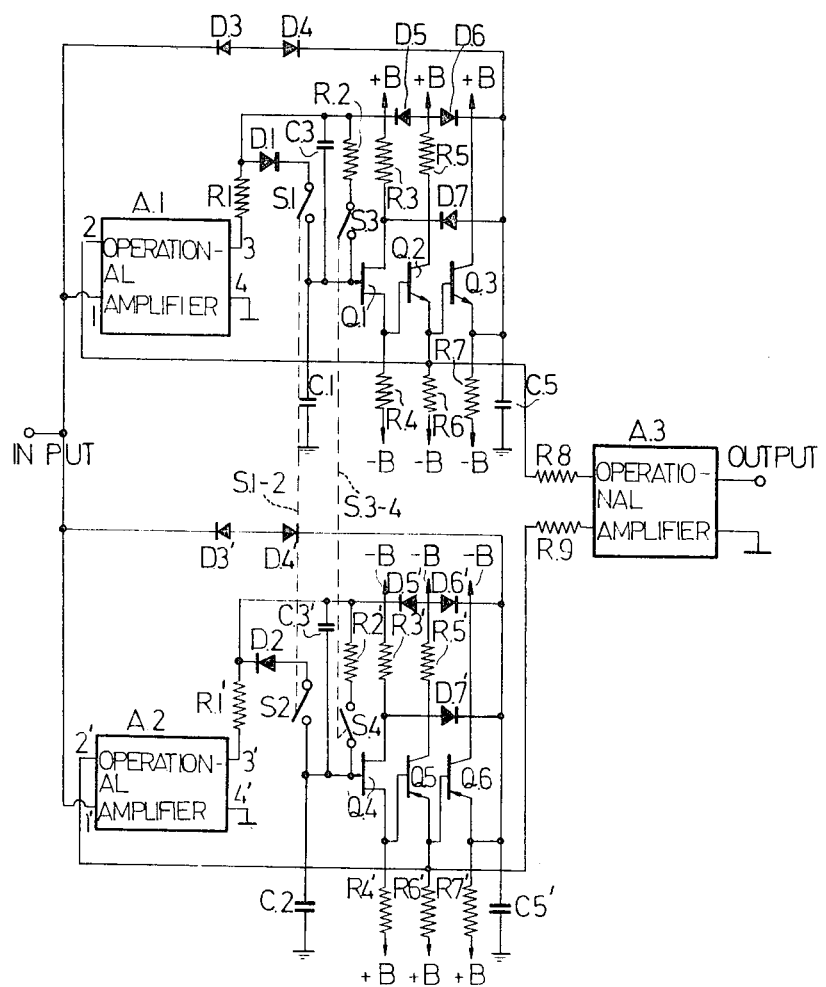
FIG. 7 is a schematic circuit diagram illustrating a preferred embodiment of the present invention.

FIG. 7 shows a detailed circuit of one embodiment of FIG. 6B. In accordance with the object of the measurement, various circuits can be utilized for measuring the peak value or peak-to-peak value by constituting a circuit corresponding to the above-mentioned block diagram. Referring to FIG. 7, an upper half portion receives a positive part of an input signal and a lower half portion receives a negative part of an input signal. A positive part of the input signal is applied to an operational amplifier $A_1$. An output of an operational amplifier is applied to an anode of the diode $D_1$ via a resistor $R_1$. A cathode of the diode $D_1$ is via a switch $S_1$ connected to the capacitor $C_1$ whose other terminal is grounded. The capacitor $C_3$ is connected in parallel to the series circuit composed of the diode $D_1$ and the switch $S_1$. The series circuit composed of a resistor $R_2$ and a switch $S_3$ is connected in parallel to the above-mentioned capacitor $C_3$. An output of the capacitor is applied to a gate of a field effect transistor $Q_1$ having a high input impedance. A drain of a field effect transistor $Q_1$ is connected to a positive potential +B via a resistor $R_3$ and a source of a field effect transistor $Q_1$ is connected to a negative potential −B via a resistor $R_4$. A source output of a field effect transistor $Q_1$ is connected to a base of a transistor $Q_2$ whose collector is connected to a positive potential +B via resistor $R_5$. An emitter of a transistor $Q_2$ is connected to a negative potential −B via resistor $R_6$. An emitter output of the transistor $Q_2$ is fedback to a terminal 2 of an operational amplifier $A_1$ and also is applied to a base of a transistor $Q_3$ whose collector is connected to a positive potential +B. An emitter of the transistor $Q_3$ is connected to a negative potential via resistor $R_7$ and is also connected to a capacitor $C_5$ whose other terminal is grounded. An emitter output of the transistor $Q_3$ is fed back to an input terminal 1 of the operational amplifier $A_1$ via a pair of diodes $D_3$ and $D_4$, to a connection point of the diode $D_1$ and the resistor $R_1$ via a pair of diode $D_5$ and $D_6$ and to the collector of the field effect transistor $Q_1$ via a diode $D_7$. The elements arranged at a lower half portion of the circuit arranged symmetrically with the above-mentioned portion has the same function except for the polarity of the diode $D_2$, field effect transistor $Q_4$ and transistors $Q_5$ and $Q_6$. The elements of the lower half having the same function as the elements of the upper half portion are designated by the same reference numerals with a prime added. With a result of this, the emitter output of the transistor $Q_2$ and the emitter output of the transistor $Q_5$ is connected, respectively, to an operational amplifier $A_3$ via resistors $R_8$ and $R_9$.

In the circuit shown in FIG. 7, a positive peak value is stored in the capacitor $C_1$ via the diode $D_1$ and picked out in the emitter of the transistor $Q_2$, and a negative peak value is stored in the capacitor $C_2$ via the diode $D_2$ and picked out in the emitter of the transistor $Q_5$. The above-mentioned positive peak value and negative peak value are respectively amplified by the operational amplifier $A_3$, thereby the peak-to-peak value of the input signal can be obtained at the output terminal of the operational amplifier $A_3$. In this case, the switches $S_1$, $S_2$ and switches $S_3$, $S_4$ are respectively provided with double switches $S_{1-2}$ and $S_{3-4}$. Further, in FIG. 7, the resistors $R_1$ and $R_1'$ are respectively provided for protecting an excess current in the diodes $D_1$ and $D_2$, the capacitors $C_3$ and $C_3'$ for preventing oscillation and the resistors $R_2$ and $R_2'$ for protecting the field effect transistor $Q_1$ and $Q_4$.

As mentioned above, the switches $S_3$ and $S_4$ are provided with reset switches. Further, the switches $S_1$ and $S_2$ are provided for ceasing the measurement in a time required and holding the stored value in the capacitors $C_1$ and $C_2$ to the next time required. The above-mentioned switches $S_1 \sim S_4$ can be operated manually and in accordance with a case required, for example, the measurement of the addendum circle of the toothed wheel, can be operated by using a micro lead relay.

The above-mentioned detailed circuit shown in FIG. 7 corresponds to a block diagram shown in FIG. 6B, however, various circuits corresponding to FIGS. 1, 2, 4A, 4B, 5A, 5B and 6A can be easily obtained thereby various measurements, for example, positive peak value or negative peak value can be carried out according to the present invention.

Modifications of the herein disclosed circuits will occur to those skilled in the art and various combinations of the circuits will be capable of use together for achieving the desired results of the invention. The scope of the invention is to be interpreted accordingly as defined by the appended claims.

What is claimed is:

1. Apparatus for measuring a peak value of an electrical signal comprising a high gain DC amplifier, the input of said amplifier being connected to an input terminal, a series circuit comprised of a diode and a capacitor, the output of said DC amplifier being connected to input side of said diode, a parallel switch means connected in parallel between both terminals of said diode, an initial voltage appearing in said input terminal being stored in said capacitor when said parallel switch means is closed, said capacitor being connected between one side of said diode and ground, a DC amplifier having a high input impedance, the junction of said diode and said capacitor being connected to the input terminal of said high input impedance DC amplifier, the output of said high input impedance DC amplifier being connected to an output terminal, a negative feedback circuit means connected between said output of said DC amplifier having a high input impedance and said input of said high gain DC amplifier.

2. Apparatus for measuring a peak value of an electrical signal comprising a high gain DC amplifier, the input of said amplifier being connected to an input terminal, a series circuit comprised of a diode and a capacitor, the output of said DC amplifier being connected to input side of said diode, a series switch means connected between said diode and said capacitor, said capacitor being connected between one side of said diode and ground, a DC amplifier having a high input impedance, the junction of said series switch means and said capacitor being connected to the input of said DC amplifier having a high input impedance, the output of said high input impedance DC amplifier being connected to an output terminal, a negative feedback circuit means connected between said output of said DC amplifier having a high input impedance and said input of said high gain DC amplifier, said output terminal delivering a measurement value, said measurement value being stopped by the opening of said series circuit switch means.

3. Apparatus for measuring a peak value of an electrical signal according to claim 2, further comprising a second switch means connected in parallel with said diode.

4. Apparatus for measuring a peak value of an electrical signal according to claim 2 further comprising a second switch means connected in parallel with said series connected diode and series switch.

5. Apparatus for measuring a peak-to-peak value of an electrical signal comprising two high gain DC amplifiers and two input terminals both of said DC amplifiers being connected to a first one of said input terminal, a pair of series circuits, the outputs of said high gain DC amplifiers being connected respectively to said series circuits, said series circuits being comprised of diodes and capacitors, said diodes being connected respectively in reverse directions, a pair of switch means, said switch means being connected in parallel with said diodes, initial voltages appearing in said two input terminals being stored in said capacitors by closing said parallel switches, a pair of high input impedance DC amplifiers, the junction of said diodes and said capacitors being connected to the respective inputs of said high input impedance DC amplifiers, remaining terminals of said capacitors being connected to the second of said input terminals, a pair of negative feedback circuit means, a pair of output terminals outputs of said high input impedance DC amplifiers being connected to said output terminals, said negative feedback circuits means being connected between the output of said high input impedance DC amplifiers and the input terminal of said high gain DC amplifiers.

6. Apparatus for measuring a peak-to-peak value of an electrical signal comprising two high gain DC amplifiers and two input terminals both said DC amplifiers being connected to one of said input terminals, a pair of series circuits, outputs of said high gain DC amplifiers being connected respectively to said series circuits, said series circuits being comprised of diodes and capacitors, said diodes being connected respectively in reverse directions, a pair of switch means connected in series between said diodes and said capacitors, the measurement being stopped by opening said series switch means, a pair of high input impedance DC amplifiers, the junction of said diodes and said capacitors being connected to the respective inputs of said high input impedance DC amplifiers, the remaining terminals of said capacitors being connected to second of said input terminals, a pair of negative feedback circuit means, a pair of output terminals outputs of said high input impedance DC amplifiers being connected to said output terminals, said negative feedback circuit means being connected between the output of said high input impedance DC amplifiers and the input terminal of said high gain DC amplifiers.

7. Apparatus for measuring a peak-to-peak value of an electrical signal according to claim 6, further comprising a second pair of switch means connected respectively in parallel with said diodes.

8. Apparatus for measuring a peak-to-peak value of an electrical signal according to claim 6 further comprising a second pair of switch means connected in parallel with said diodes and said first mentioned pair of switch means.

* * * * *